United States Patent [19]

Zückert et al.

[11] 3,979,346

[45] Sept. 7, 1976

[54] EMULSIFIERS FOR PREPARING AQUEOUS DISPERSIONS OF ALKYD RESINS

[75] Inventors: Bertram Zückert; Wolfgang Schmut, both of Graz, Austria

[73] Assignee: Vianova-Kunstharz A.G., Vienna, Austria

[22] Filed: Oct. 31, 1974

[21] Appl. No.: 519,628

[52] U.S. Cl. .............................. 260/23 CP; 260/20; 260/22 CB
[51] Int. Cl.² ......................................... C08L 91/00
[58] Field of Search............ 260/23 EP, 22 T, 22 M, 260/22 R, 22 A, 21, 20, 22 EP

[56] References Cited
UNITED STATES PATENTS

| | | | |
|---|---|---|---|
| 2,634,245 | 4/1953 | Arndt | 260/22 T |
| 3,223,658 | 12/1965 | Kraft | 260/22 T |
| 3,269,967 | 8/1966 | Broadhead | 260/22 A |
| 3,379,548 | 4/1968 | Jen | 260/22 |
| 3,437,615 | 4/1969 | Hanson | 260/22 EP |
| 3,437,618 | 4/1969 | Taft | 260/20 |
| 3,440,193 | 4/1969 | Campagna | 260/22 EP |
| 3,457,206 | 7/1969 | Tonner | 260/22 |

*Primary Examiner*—Lewis T. Jacobs
*Assistant Examiner*—William E. Parker
*Attorney, Agent, or Firm*—A. W. Breiner

[57] ABSTRACT

Emulsion systems for preparing aqueous dispersions of alkyd resins; aqueous dispersions of alkyd resins, and a process of making the dispersions are described. The emulsion system comprises an aqueous medium containing 0.5 to 3 percent by weight ammonia and (A) at least one non-ionic emulsifier, the hydrophobic part containing two or more radicals of unsaturated fatty acid and/or fatty alcohol with an iodine number of between 130 and 200, and the hydrophilic part containing polyethylene glycol chains and/or monomethoxypolyethylene glycol chains with from 6 to 100 ethylene oxide units; and (B) at least one anionic emulsifier, the hydrophobic part containing two or more radicals of unsaturated fatty acid and/or fatty alcohol with an iodine number of between 130 and 200, and the hydrophilic part including carboxylic groups. In accordance with the process for dispersing alkyd resins, the alkyd resin is dispersed in water containing 0.5 to 3 percent by weight of ammonia employing the aforesaid emulsion combination, at least 50 percent of the carboxyl groups of the anionic emulsifier being dissociated by the ammonia. The aqueous dispersions of the invention permit the use of lower amounts of polyethylene glycol in the emulsifier system in relation to the prior art systems. The cured films of the dispersions have the emulsifier chemically linked to the alkyd resin. This feature is responsible for the excellent water and alkali resistance of the films.

27 Claims, No Drawings

EMULSIFIERS FOR PREPARING AQUEOUS DISPERSIONS OF ALKYD RESINS

The present invention is concerned with an emulsifier combination for dispersing alkyd resins, to the alkyd resin dispersions, and to a process for producing aqueous dispersions of alkyd resins using the particular emulsifier combination.

Aqueous paint vehicles have gained increasing importance during recent years. It is predicted that this trend will increase in the future due to the aggravating problems of pollution control which will preclude exhausting organic solvents into the air without coercive necessity, and the shortage of raw materials including organic solvents. The spectrum of water-dilutable resin systems is, however, as yet incomplete, and these systems cannot replace conventional binders for every purpose. Airdrying resins, conventionally applied mainly in form of solutions in aliphatic or aromatic hydrocarbons, cannot be replaced entirely with aqueous systems. Films from aqueous polymer dispersions of ethylenically unsaturated monomers (e.g., dispersions of vinyl acetate, polyolefins or polyacrylates) do not perform nearly as well as conventional, i.e., organic solvent containing, alkyd resins, with respect to appearance (flow, gloss, etc.) or protective effect (water resistance, weather resistance, etc.). Watersoluble alkyd resins in air-drying paints have not replaced organic solvent alkyd resin systems, partly due to the fact that the medium molecular weight of the alkyd resin for aqueous systems has to be kept low in order to attain good water solubility. This, in turn, delays the drying speed. Furthermore, the resins, despite the low molecular weight, require large quantities of auxiliary solvents which may be toxic (e.g., glycol ethers) and organic amines.

Contrary to the use of water-soluble alkyd resins, aqueous dispersions of alkyd resins would be highly practical in an air-drying system in that organic solvents in general can be omitted totally and drying speed is equal to that of conventional resins, i,e., alkyd resins in organic solvents, since the molecular weight need not be kept low as is the case with water-soluble resins. Nevertheless, such alkyd resin dispersions have not gained substantial importance, since up to now it has been impossible to stabilize the dispersions without impairing the other properties. That is, alkyd resins substantially are hydrophobic materials which do not form stable dispersions in water. Emulsifiers in general are substances with amphipatic molecular structure which means that they consist of a molecule having a hydrophobic and a hydrophilic part. Owing to such structure, the emulsifier molecules concentrate in the interfacial zone between water and resin, reduce the contact surface tension and thus enable tiny resin drops to form in the aqueous phase. Up to now, best results have been obtained with non-ionic emulsifiers produced by addition reaction of ethylene oxide to octyl- or nonyl-phenol, i.e., such types which carry a hydrophobic alkyl phenol radical and a hydrophilic polyethylene chain. Such systems are described, e.g., in U.S. Pat. Nos. 3,223,658; 3,269,967, and 3,440,193. Such emulsifiers, when used in quantities of 5 – 10 percent of the dispersions, yield sufficient stability of the dispersion. However, there is a disadvantage in that the emulsifiers remain in the film unchanged and, thus, cause a reduction in the water resistance. This reduced water resistance seriously limits the use of such dispersions. Other methods of preparing alkyd resin dispersions are described in U.S. Pat. Nos. 2,634,245; 2,853,459; 3,133,032; 3,223,659; 3,379,548; 3,437,615; 3,437,618; 3,442,835; 3,457,206, and 3,639,315; in Deutsche Offenlegungsschrift No. 1,495,031, and in British Pat. Nos. 1,038,696, and 1,044,821. According to the methods of these latter references, polyethylene glycol chains are introduced into the alkyd by esterification or re-esterification. The advantage over "external emulsifiers" is said to be improved water resistance of the films due to a chemical linking of the hydrophilic groups to the resin molecules. But, on substrates which do not absorb water, such as metal or glass, the results are worse rather than better. The reason is that with this method, as with the earlier-noted method, the stability of the dispersions is due to amphipatic molecules which result from the reaction of the polyethylene glycols with the other alkyd resin components. It is known that alkyd resin molecules are quite heterogeneous with regard to size and structure. The same applies to molecules with built-in or linked polyethylene glycol chains. The only molecules which can arrange well in the contact area of water/resin and, thus, become effective must meet the following conditions:

1. The molecules must be of strictly amphipatic character, i.e., they must consist of a hydrophilic and a hydrophobic part;

2. The weight ratio of hydrophilic/hydrophobic component must lie within a certain range. For non-ionic emulsifiers based on polyethylene glycol for oil-in-water emulsions of alkyds it is between 5 : 5 and 8 : 2; and 3. The molecular weight of the emulsifier molecules must not be too high or too low.

It is clear that these conditions prevail only in a relatively small proportion of the alkyd resin molecules prepared according to the mentioned methods and containing polyethylene glycol. The result is that substantially more polyethylene glycol (normally between 10 and 20 percent) must be employed than when using definitely constructed external emulsifiers. A further result is a reduction in the water resistance of the paint films which compensates or over-compensates the advantages of a chemical linking of the hydrophilic groups.

It has now been found that a substantial improvement in aqueous dispersions of alkyd resins over known methods is obtained when using a combination of emulsifiers specially designed for the production of alkyd resin dispersions. These special emulsifiers are mixtures of ionic with non-ionic emulsifiers. Accordingly, the invention is primarily concerned with an emulsifier system for alkyd resin dispersions, to the dispersions, and to a process for producing aqueous dispersions of preferably air-drying, unsaturated fatty acid modified alkyd resins. According to the invention, the alkyd resin is dispersed in water which contains from about 0.5 – 3 percent by weight of ammonia, and from about 4 – 10 percent by weight of a dispersing agent or emulsifier system which is a combination of A. at least one non-ionic emulsifier, the hydrophobic part of which consists of two or more radicals of unsaturated fatty acids and/or fatty alcohols with an iodine number between 130 and 200, and the hydrophilic part consists of chains of polyethylene glycol and/or monomethoxypolyethylene glycol with 6 – 100 ethylene oxide units; and B. at least one anionic emulsifier, the hydrophobic part of which consists of two or more radicals of unsaturated fatty acids and/or fatty alcohols with an iodine number of between 130 and 200, and the hydrophilic part consists of carboxy groups, at least 50 percent of which are dissociated by the ammonia utilized.

Minor amounts of organic solvents can be employed. The dispersion is preferably carried out at 80° – 90°C. however, it can be carried out under pressure at temperatures above 100°C. The link between hydrophilic and hydrophobic molecule part or section in the anionic component, e.g., adducts of maleic acid with drying oils or esters of dimethylol propionic acid with drying fatty acids, or semi-esters of di- or polycarboxylic acids with fatty alcohols or hydroxy groups containing partial esters of drying fatty acids and polyols are — C — C — or

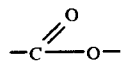

structures.

The non-ionic emulsifiers may be linked via the following groups:

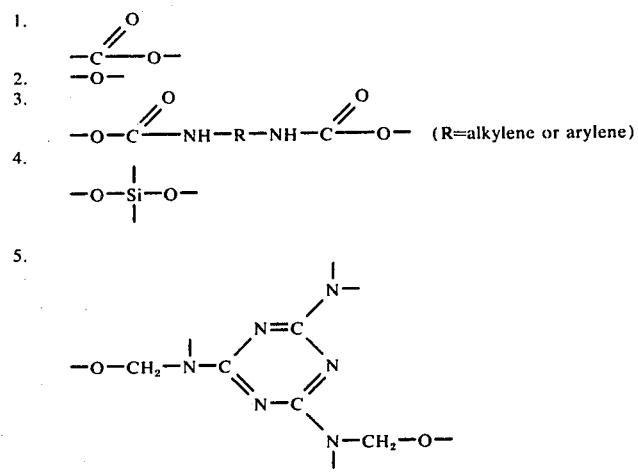

These linkages in the non-ionic emulsifier are obtained, for example, by -

1. Reaction products of addition products of maleic acid with drying vegetable and synthetic oils with ethylene oxide;
2. Reaction products of hydroxy group containing partial esters of drying fatty acids and polyols with ethylene oxide;
3. Reaction products of hydroxy group containing partial esters of drying fatty acids and polyols with toluylene diisocyanate and polyethylene glycols or methoxypolyethylene glycols;
4. Reaction products of unsaturated fatty alcohols with tetraethoxysilane and polyethylene glycols and/or methoxypolyethylene glycols; and
5. Reaction products of unsaturated fatty alcohols or hydroxy groups containing partial esters of fatty acids and polyols with hexamethoxy-hexamethylmelamine and polyethylene glycols and/or methoxypolyethylene glycols.

Ionic and non-ionic hydrophilic radicals may be concurrently present in one or the same molecule. Such emulsifiers are, e.g., reaction products of adducts of drying oils and maleic anhydride with polyethylene glycols and/or methoxypolyethylene glycols.

The emulsifiers of the invention have a substantially greater effect in preparing the alkyd dispersions than the conventional alkylphenol-ethylene oxide adducts. Therefore, the total quantities of polyethylene glycol required for obtaining equal stability of the alkyd resin dispersions is substantially lower. For preparing high quality dispersions, 2 – 5 percent by weight of polyethylene glycol in the presently disclosed emulsifiers are sufficient; whereas over 4 – 7 percent by weight polyethylene glycol is required when using alkylphenol emulsifiers or 10 – 20 percent by weight of polyethylene glycol when the glycol is built into the alkyd resins. It is a special advantage of the emulsifiers of the invention that the unsaturated chains of the fatty acids or fatty alcohols take part in the film formation due to autoxidative cross-linking and are built-in or chemically bonded to the resin systems. Accordingly, no free emulsifier molecules remain in the film, which means that the water resistance of films prepared from the dispersions of the invention are markedly enhanced over films prepared from prior art dispersions. The performance of the films is substantially equivalent to that of conventional alkyd resins and meets all practical requirements. A further advantage of the emulsifiers of the invention over conventional emulsifiers is that the combination of emulsifiers can be carried almost at random, which guarantees optimal results with practically any type of alkyd resin.

The blending ratio of non-ionic and anionic emulsifier can range from between about 9 : 1 and 3 : 7. The weight proportion of the ethyleneoxide chains of the polyethylene glycol in the non-ionic emulsifier may be varied within 40 and 80 percent. Special effects can be obtained by mixing emulsifiers with long and short ethylene oxide chains. The acid value as a measure for the content of carboxy groups of the anionic emulsifier can range from about 80 and 220 mg KOH/g. In the combined anionic-nonionic emulsifiers the acid value can range from about 20 and 150 mg KOH/g.

The spacing of the molecule segments is of decisive importance. This applies particularly to non-ionic emulsifiers, offering a variety of possibilities for modification. The most effective are polyethylene glycol chains linked at one end, the effect increasing with rising chain length, polyethylene chains linked at two ends are effective only if the chain length allows a folding of the chain and, thus, the formation of an amphipatic configuration of the total molecule. Short chain polyethylene glycols linked at both ends cause a gradual increase in the polarity of the hydrophobic molecular section and, thus, an increase in the efficiency of the emulsifiers with short oil alkyds with high hydroxyl number. Another possibility for adjustment lies in the choice of the linking compound.

The total quantity of the emulsifier blend or combination in the resin dispersion ranges from about 4 and 10 percent. The emulsifiers are effectively distributed in the alkyd resin at 80° – 100°C. Then the desired quantity of water containing about 0.5 – 3 percent by weight of ammonia is mixed by stirring while cooling and then, with cooling continued, the emulsion is formed by dispersing for 2 – 3 minutes with a disperser at a speed of 10,000 rpm, e.g., with an Ultraturrax (Janke and Kunkel, K.G.). In addition to the emulsifiers of the invention, it is, of course, possible to co-employ small quantities of common emulsifiers and protective colloids (i.e., cellulose ethers, polyvinyl alcohol, polyacrylic acid or polyacrylamide) as long as the film resistance and stability of the alkyd dispersion are not adversely affected. In general, the process can be applied to any type of alkyd resin either air-drying or stoving. Due to their consistency, products containing higher levels of fatty acids afford more ease of processing than with lower fatty acid content. Optionally, for enhancing the application consistency of a short alkyd resin, small quantities of solvents can be added. At temperatures above 100°C., and with pressure any alkyd resin can be processed solvent-free.

The following examples illustrate the invention without limiting the scope thereof. Parts are by weight unless otherwise stated.

A. Description of the alkyd resins

Normally available or conventional alkyd resins can be used in accordance with the present invention. These are exemplified by the resins with the constitution and characteristics listed at Table I. In producing the resin dispersions, the resins are used solvent-free. In the comparison of the claimed dispersions with solvent dissolved alkyds, the resins are applied as their white spirit or xylol solutions.

B. Preparation of the emulsifiers

E. 01 (nonionic emulsifier)

880 g of linseed oil are reacted at 200°C. under the protection of inert gas with a total of 200 g of maleic anhydride to form an adduct. The linseed-maleic anhydride-adduct (8.8 : 2) obtained is mixed with 36 g of water and a catalytic quantity of triethylamine and held at reflux for 3 hours at 100° – 110°C. The free carboxy groups are reacted with ethylene oxide in known manner in an autoclave, using sodium methylate as a catalyst. The components are mixed 1 : 3 (opened adduct : ethylene oxide). The resulting product is a highly viscous yellow oil with an ethylene oxide content of 75 percent by weight.

E. 02 (mixed nonionic-anionic emulsifier)

1080 g linseed-maleic anhydride-adduct (8.8 : 2) of E. 01 are reacted at 120°C. with 2200 g of methoxypolyethylene glycol (molecular weight about 1100) until the acid value has fallen to 30 – 35 mg KOH/g. The resultant yellow wax-like mass has an ethylene oxide content of 67 percent by weight.

E. 03 (mixed nonionic-anionic emulsifier)

880 g of linseed oil and 100 g of maleic anhydride are reacted at 200°C. under inert gas protection until the maleic anhydride has adducted completely. The batch is cooled and 1500 g of polyethylene glycol (molecular weight about 3000) are added. The reaction is carried at 120°C. to an acid value of 20 – 25 mg KOH/g. The resulting emulsifier is wax-like and has an ethylene oxide content of 60.5 percent by weight.

E. 04 (nonionic emulsifier)

840 g of safflower oil fatty acid, 136 g of pentaerythritol and 0.5 g of dibutylstannum dilaurate are heated to 210°C. and esterified azeotropically at this temperature until an acid value of below 2 mg KOH/g is obtained, using xylol as entraining agent. The resulting triester is reacted in an autoclave with ethylene oxide at a weight ratio of 1 : 2.3. The resultant yellow wax-like substance has an ethylene oxide content of 70 percent by weight.

E. 05 (nonionic emulsifier)

134 g of trimethylolpropane, 560 g of linseed oil fatty acid and 0.7 g of dibutyl stannum dilaurate are heated to 200°C. and held for 30 minutes. Then the batch is esterified azeotropically to an acid value of below 2 mg KOH/g. 658 g of the obtained diester are reacted with 174 g of tolylene diisocyanate for 60 minutes at 50°C.

TABLE I*

| Alkyd | Ingredients | Oil Content Percent | Acid Value DIN 53183 (resin solids) | Viscosity DIN 53211 |
|---|---|---|---|---|
| A 1 | safflower oil fatty acid pentaerythritol phthalic anhydride | 72 | 9.5 | 60 s/60 % in white spirit |
| A 2 | soya bean oil pentaerythritol phthalic anhydride | 63 | 7.8 | 52 s/50% in white spirit |
| A 3 | linseed oil glycerol phthalic anhydride | 55 | 10.3 | 275 s/50% in white spirit |
| A 4 | soya bean oil trimethylolpropane phthalic anhydride | 47 | 8.0 | 54 s/40% in white spirit |
| A 5 | dehydrated castor oil trimethylolpropane pentaerythritol | 37 | 22.0 | 95 s/50% in xylol |

*All of the resins are prepared employing customary processing, i.e., heating at appropriate temperatures while withdrawing water of reaction until the designated low acid value is obtained. Parts of the ingredients are adjusted to provide the designated oil content.

in the presence of 360 g of absolute toluol. The reaction product is added over a period of 3 hours to a solution of 1100 g of methoxypolyethylene glycol (average molecular weight about 1100) in 100 g of toluol which is heated to 60°C. After another hour the reaction is finished and the solvent is vacuum stripped.

E. 06 (nonionic emulsifier)

532 g of fatty alcohol of linseed oil fatty acids with an iodine number of 165, 208 g of tetraethoxysilane, 1100 g of methoxypolyethylene glycol (molecular weight about 1100) and 5 g of tetrabutyl titanate are heated to 120°C. and held at this temperature until 138 g of ethanol have distilled off. The ethylene oxide content is 59.8 percent by weight. E. 07 (nonionic emulsifier)

390 g of hexamethoxymethylmelamine, 532 g of the fatty alcohol used in E. 06 and 1500 g of methoxypolyethylene glycol (molecular weight about 500) are held at 190°C. until 160 g of methanol have distilled off. The emulsifier contains 66 percent by weight of ethylene oxide.

E. 08 (nonionic emulsifier)

390 g of hexamethoxymethylmelamine, 532 g of the fatty alcohol used in E. 06 and 2520 g of methoxypolyethylene glycol (molecular weight about 840) are held at 190°C. until 160 g of methanol have distilled off. The emulsifier has an ethylene oxide content of 76 percent by weight.

E. 09 (anionic emulsifier)

1180 g of an adduct prepared as in E. 01 from 880 g of linseed oil, 300 g of maleic anhydride, 54 g of water, 5 g diacetone alcohol and catalytic quantities of triethylamine are held at 110°C. until the acid value is about 160 mg KOH/g.

E. 010 (mixed nonionic anionic emulsifier)

658 g of a diester of trimethylpropane and linseed oil fatty acids (see E. 05) are reacted in the autoclave with 264 g of ethylene oxide. The resulting product is reacted at 100°C. with 98 g of maleic anhydride until the acid value is 55 – 60 mg KOH/g.

E. 011 (mixed nonionic-anionic emulsifier)

560 g of linseed oil fatty acid and 150 g of triethylene glycol are heated to 180°C. in the presence of 0.7 g of dibutyl stannum dilaurate and held at this temperature, until the substantial part of the reaction water has distilled off. The batch is esterified azeotropically at 210°C. to an acid value of below 5 mg KOH/g. 674 g of the resultant product are mixed with 196 g of maleic anhydride and held at 200°C. until the maleic anhydride has adducted completely. After cooling 1000 g of methoxypolyethylene glycol (molecular weight about 500) are added, the batch is heated to 120°C. and held for 30 minutes. The ethylene oxide content is 53.5 percent by weight.

C. Preparation of the dispersions (Examples 1 – 10)

Each 100 g of the alkyd resins of Table I are dispersed with the quantities of emulsifiers listed in Table II at 50° – 150°C. for 30 seconds with the aid of an Ultra-Turrax disperser. While cooling, 40 ml of an aqueous solution of ammonia are added and dispersing is continued at full speed for 2 minutes. In order to improve the freeze-thaw-stability of the dispersions, a usual additive, e.g., 1 percent by weight of ethylene glycol, is added.

D. Evaluation of the dispersions

1. Determination of the type of the dispersion

The determination of the type of the dispersion is based on a mixing test with water. If the dispersion is miscible with water, it is an oil-in-water (o/w) dispersion. If it is immiscible with water it is a waterin-oil (w/o) dispersion.

2. Determination of the particle size

The particle size and particle size distribution is determined by microphotography. The counting and recording of the particles and their size is done from the enlarged positive.

3. Testing of the stability a. Centrifuge: The quantity of water separating at the centrifugation of a dispersion is a measure of its stability. The more serum separates, the less stable is the dispersion. The dispersion is centrifuged in three different concentrations (70, 50, 30 percent by weight) at 13,500 rpm for 30 minutes, and the percentage of water separated of the total water is recorded.

b. Freeze-thaw-stability: The number of freeze-thaw-cycles the dispersion remains unchanged is a measure of its stability on storage at temperatures around 0°C. One cycle consists of 8 hours of thawing at 20°C. and 16 hours of freezing at −4°C. A stability of 5 cycles is considered sufficient.

4. Film-formation: The dispersions are combined with the quantities of cobalt, lead and calcium driers normally used with conventional alkyd resins and the dispersions are applied to glass plates. Dry film thickness 30 ± 5 $\mu$m; the drying speed measured on the drying recorder (hours required to become "dust-free," "touch-dry" and "through-dry") and the appearance of the film are recorded. Alkyd resin A 5, as an exception, was combined with 30 percent of hexamethoxymethylmelamine and stoved at 180°C. for 30 minutes.

5. Water resistance of the film

After 48 hours of drying the water resistance of the film is tested: The panels are water soaked and evaluated after 30 minutes, 4 hours, and 48 hours using a 5 step grading procedure:

1. no turbidity
2. slightly opaque, film recovers completely
3. definitely opaque, film recovers completely
4. severe opacity, film recovers partly
5. destruction of film In the Table, or example, the reading 1/1 – 2/2 equals a grading of 1 after 30 minutes; between 1 and 2 after 4 hours, and 2 after 48 hours.

E. Comparison examples

Comparison example 1 shows the properties of a typical dispersion based on known nonylphenolethylene oxide emulsifiers: Alkyd resin A 1 is emulsified by dispersing in aqueous ammonia solution, 1 percent ammonia, in the presence of 5 percent of an emulsifier with 30 mols ethylene oxide and 2 percent of an emulsifier with 6 mols of ethylene oxide per mol of nonyl phenol, to obtain a dispersion with 70 percent solids content.

Comparison example 2 shows the properties of a resin containing polyethylene glycol built in. It is obtained through reaction of Alkyd resin A 1 with 15 percent of a polyethylene glycol with an average molecular weight of 1500, at 220°C., until the mass becomes clear. The resulting polyethylene glycol modified alkyd resin is dispersed in aqueous ammonia, 1 percent, to obtain a dispersion with 70 percent solids content.

The properties of the dispersions are tabulated in Table II.

Key to Table II:

Dispersion blend: Alkyd resin, emulsifiers and quantities; quantity of ammonia and concentration of the resulting dispersion.

Viscosity: measured on a 60 percent solution, shear speed $D = 30.38$ s$^{-1}$.

GTT: number of freeze thaw cycles.

$h$: hour, and "1 $h$ 30" is 1 hour and 30 minutes.

All other figures see paragraph D, hereinbefore.

anionic emulsifier combinations, whether the non-ionic and anionic emulsifiers are prepared singly or as mixed emulsifiers, with ammonium compare favorably with the organic solvent alkyd dispersions of the prior art. On the other hand, aqueous alkyd solutions (comparison 1 and comparison 2) are inferior in stability and/or drying time and/or viscosity and/or water resistance.

As has been noted hereinbefore, the alkyd resins employed in the dispersions of the present invention can be any of those conventionally employed in the

TABLE II

| Dispersion Blend | Type | Particle $\phi\mu$m | Visc. P/20° (60%) | Stability Centrifuge 70 | 50 | 30 | GTT | Film Formation Drying Time | | | Appearance | Water Resistance |
|---|---|---|---|---|---|---|---|---|---|---|---|---|
| A 1 E.02/7% — 1% NH$_3$ 70% | o/w | 1–2 | 24 | 0 | 12 | 40 | 5 | 1h30 | 2h15 | 4h00 | clear | 1/1–2/2 |
| A 1 E.03/7% — 1% NH$_3$ 70% | o/w | 1–2 | 31 | 0 | 8 | 35 | 5 | 1h30 | 2h00 | 3h45 | clear | 1/1/1–2 |
| A 1 E.05/5% E.09/2% 0.75% NH$_3$ 70% | o/w | 1.5–2.5 | 15 | 0.5 | 16 | 48 | 4 | 1h45 | 2h15 | 4h30 | clear | 1–2/2–3/2–3 |
| A 1 70% white spirit | | | 2.8 | | | | | 1h00 | 1h30 | 3h30 | clear | 1/1/1–2 |
| A 2 E.01/5% E.09/2% 1.5% NH$_3$ 70% | o/w | 0.5–2 | 39 | 0 | 9 | 38 | 5 | 1h00 | 2h00 | 3h30 | clear | 1/1–2/1–2 |
| A 2 E.04/4% E.09/2% 1% NH$_3$ 70% | o/w | 1.5–2 | 21 | 0 | 15 | 45 | 5 | 1h00 | 2h15 | 3h30 | clear | 1/1/1–2 |
| A 2 E.06/6% E.09/1% 1.25% NH$_3$ 70% | o/w | 0.5–1.5 | 49 | 0 | 10 | 40 | 5 | 1h15 | 2h00 | 3h15 | clear | 1/1/1 |
| A 2 60% white spirit | | | 10.3 | | | | | 0h45 | 1h45 | 3h00 | clear | 1/1/1 |
| A 3 E.07/4% E.09/3% 1.5% NH$_3$ 70% | o/w | 1.5–2.5 | 36 | 0.5 | 18 | 49 | 5 | 0h45 | 1h30 | 6h30 | clear | 1/1–2/2–3 |
| A 3 50% white spirit | | | 9.3 | | | | | 0h45 | 1h15 | 5h45 | clear | 1/1/1–2 |
| A 4 E.08/6% E.09/2% 1% NH$_3$ 70% | o/w | 1.5–2 | 35 | 0 | 12 | 38 | 5 | 1h00 | 1h45 | 7h00 | clear | 1/2/2 |
| A 4 45% white spirit | | | 7.5 | | | | | 0h50 | 1h00 | 6h00 | clear | 1/1/1 |
| A 5 E.011/5% E.010/2% 2% NH$_3$ 70% | o/w | 2–3 | 57 | 0.5 | 18 | 48 | 5 | | | | clear | 1/1/1 |
| A 5 60% xylol | | | 18 | | | | | | | | | 1/1/1 |
| A 1 E.03/6% E.07/4% 1% NH$_3$ 70% | o/w | 0.5–1.5 | 45 | 0 | 11 | 42 | 5 | 1h30 | 2h15 | 4h00 | clear | 1/2/2–3 |
| comparison example 1 | o/w | 1.5–2.5 | 23 | 0 | 39 | 64 | 4 | 2h00 | 2h45 | 5h00 | clear wrinkles | 1–2/3/4 |
| comparison example 2 | o/w | 0.5–1.5 | 63 | 0 | 13 | 39 | 5 | 3h30 | 4h45 | 10h00 | clear | 2–3/4–5/5 |

As apparent from Table II, the aqueous alkyd dispersions of the claimed invention, using non-ionic and anionic emulsifier combinations, compare favorably with the organic solvent alkyd dispersions of the prior art. Additionally, although the dispersions in the examples of Table II were made in an aqueous medium, it is possible to employ minor amounts, up to about 30 percent by volume, of an organic solvent. The organic solvent is particularly useful when the alkyd is of the short oil type. Furthermore, as noted hereinbefore, preferably the dispersing aid or emulsion combination used in accordance with the present invention is a blend of 30 to 90 percent by weight to 10 to 70 percent by weight of non-ionic and anionic emulsifier. Within this range an optimum range is from 70 to 90 percent by weight non-ionic to 10 to 30 percent by weight anionic emulsifier. In the emulsifier combination the ethylene oxide chains in the non-ionic emulsifier preferably range from about 40 to 80 percent by weight. However, where the emulsifier combination is a mixed non-ionic - anionic emulsifier, the ethylene oxide chains preferably range from about 40 to 70 percent by weight. Additionally, as noted hereinbefore, at times it is preferable to utilize jointly non-ionic emulsifiers with different ethylene oxide chain lengths. When this is done, a preferred combination is a non-ionic emulsifier having ethylene oxide chains of from about 6 to 15 mols ethylene oxide with non-ionic emulsifiers with ethylene oxide chains having from about 20 to 100 mols of ethylene oxide. Other modifications can be made within the context of the present invention. These modifications being within the ability of one skilled in the art form a part of the present invention.

It is claimed:

1. An alkyd resin dispersion dispersed in water containing 0.5 to 3 percent by weight of ammonia and as a dispersing aid, an emulsifier combination of (A) at least one non-ionic emulsifier, the hydrophobic part containing two or more radicals of a member of the group consisting of unsaturated fatty acids; unsaturated fatty alcohols, and mixtures thereof, with an iodine number of from about 130 to 200, and the hydrophilic part contains a member of the group consisting of polyethylene glycol chains, monomethoxypolyethylene glycol chains, and mixtures thereof, with 6 to 100 ethylene oxide units; and (B) at least one anionic emulsifier, the hydrophobic part containing two or more radicals of a member of the group consisting of unsaturated fatty acids; unsaturated fatty alcohols, and mixtures thereof, with an iodine number of from about 130 to 200, and the hydrophilic part contains carboxyl groups, at least 50 percent of said carboxyl groups being dissociated by the ammonia utilized, the amounts of and ratios of (A) and (B) being sufficient to disperse said alkyd resin in water and said ammonia.

2. The dispersion of claim 1 wherein the hydrophobic part and the hydrophilic part of the non-ionic emulsifiers are linked by at least one of the radicals selected from the group consisting of

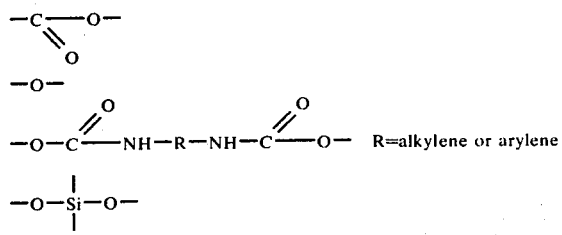

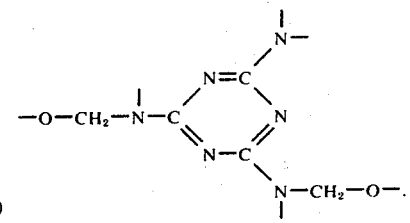

3. The dispersion of claim 1 wherein the hydrophobic and hydrophilic parts of the anionic emulsifier are linked by the radicals — C — C — or

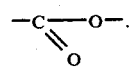

4. The dispersion of claim 1 wherein the anionic and non-ionic radicals are contained in a single molecule.

5. The dispersion of claim 1 wherein the dispersing aid is a blend of from about 30 to 90 percent by weight to from about 10 to 70 percent by weight of non-ionic and anionic emulsifiers.

6. The dispersion of claim 5 wherein the blend of emulsifiers is from about 70 to 90 percent by weight non-ionic to from about 10 to 30 percent by weight anionic emulsifier.

7. The dispersion of claim 1 wherein the proportion of ethylene oxide chains in the non-ionic emulsifier ranges from about 40 to 80 percent by weight.

8. The dispersion of claim 4 wherein the proportion of ethylene oxide chains in the mixed non-ionic-anionic emulsifier ranges from about 40 and 70 percent by weight.

9. The dispersion of claim 1 wherein non-ionic emulsifiers with ethylene oxide chains having from about 6 to 15 mols ethylene oxide and non-ionic emulsifiers with ethylene oxide chains having from about 20 to 100 mols of ethylene oxide are jointly employed as the non-ionic part of the emulsifier combination.

10. The dispersion of claim 1 wherein the acid value of the anionic emulsifier ranges from about 80 to 220 mg KOH/g.

11. The dispersion of claim 1 wherein the acid value of the combined non-ionic and anionic emulsifier combination ranges from about 20 to 150 mg KOH/g.

12. The dispersion of claim 1 wherein the alkyd resin is an airdrying alkyd resin modified with ethylenically unsaturated moieties.

13. The dispersion of claim 12 wherein the unsaturated moiety is derived from at least one fatty acid.

14. An emulsifier combination for use in preparing aqueous alkyd resin dispersions comprising (A) at least one non-ionic emulsifier, the hydrophobic part containing two or more radicals of a member of the group consisting of unsaturated fatty acids; unsaturated fatty alcohols, and mixtures thereof, with an iodine number of from about 130 to 200, and the hydrophilic part contains a member of the group consisting of polyethylene glycol chains, monomethoxypolyethylene glycol chains, and mixtures thereof, with 6 to 100 ethylene oxide units; and (B) at least one anionic emulsifier, the hydrophobic part containing two or more radicals of a member of the group consisting of unsaturated fatty acids; unsaturated fatty alcohols, and mixtures thereof, with an iodine number of from about 130 to 200, and the hydrophilic part contains carboxyl groups, at least 50 percent of said carboxyl groups being dissociated with ammonia, the amounts of and ratios of (A) and (B) being sufficient to disperse an alkyd resin in a solution of ammonia and water.

15. The emulsifier combination of claim 14 wherein the hydrophobic part and the hydrophilic part of the non-ionic emulsifiers are linked by at least one of the radicals selected from the group consisting of

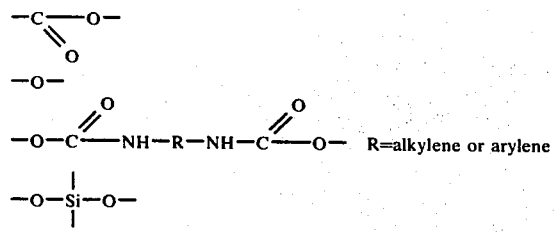

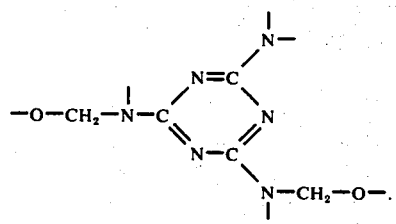

16. The emulsifier combination of claim 14 wherein the hydrophobic and hydrophilic parts of the anionic emulsifier are linked by the radicals — C — C — or

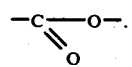

17. The emulsifier combination of claim 14 wherein the dispersing aid is a blend of from about 30 to 90 percent by weight to form about 10 to 70 percent by weight of non-ionic and anionic emulsifiers.

18. The emulsifier combination of claim 14 wherein the anionic and non-ionic radicals are contained in a single molecule.

19. The emulsifier combination of claim 17 wherein the blend of emulsifiers is from about 70 to 90 percent by weight non-ionic to from about 10 to 30 percent by weight anionic emulsifier.

20. The emulsifier combination of claim 14 wherein the proportion of ethylene oxide chains in the non-ionic emulsifier ranges from about 40 to 80 percent by weight.

21. The emulsifier combination of claim 18 wherein the proportion of ethylene oxide chains in the mixed non-ionic - anionic emulsifier ranges from about 40 and 70 percent by weight.

22. The emulsifier combination of claim 14 wherein the non-ionic emulsifiers with ethylene oxide chains having from about 6 to 15 mols ethylene oxide and non-ionic emulsifiers with ethylene oxide chains having from about 20 to 100 mols of ethylene oxide are jointly employed as the non-ionic part of the emulsifier combination.

23. The emulsifier combination of claim 14 wherein the acid value of the anionic emulsifier ranges from about 80 to 220 mg KOH/g.

24. The emulsifier combination of claim 14 wherein the acid value of the combined non-ionic and anionic emulsifier combination ranges from about 20 to 150 mg KOH/g.

25. The emulsifier combination of claim 14 wherein the alkyd resin is an air-drying alkyd resin modified with ethylenically unsaturated moieties.

26. Process for producing aqueous dispersions by dispersing an alkyd resin in water containing 0.5 to 3 percent by weight of ammonia in the presence of an emulsifier combination of (A) at least one non-ionic emulsifier, the hydrophobic part containing two or more radicals of a member of the group consisting of unsaturated fatty acids; unsaturated fatty alcohols, and mixtures thereof, with an iodine number of from about 130 to 200, and the hydrophilic part contains a member of the group consisting of polyethylene glycol chains, monomethoxypolyethylene glycol chains, and mixtures thereof, with 6 to 100 ethylene oxide units; and (B) at least one anionic emulsifier, the hydrophobic part containing two or more radicals of a member of the group consisting of unsaturated fatty acids; unsaturated fatty alcohols, and mixtures thereof, with an iodine number of from about 130 to 200, and the hydrophilic part contains carboxyl groups, at least 50 percent of said carboxyl groups being dissociated by the ammonia utilized, the amounts of and ratios of (A) and (B) being sufficient to disperse said alkyd resin in water and said ammonia.

27. The process of claim 26 wherein the dispersing is accomplished with a high-speed disperser.

* * * * *

UNITED STATES PATENT AND TRADEMARK OFFICE
CERTIFICATE OF CORRECTION

PATENT NO. : 3,979,346
DATED : September 7, 1976
INVENTOR(S) : Bertram ZUCKERT ET AL It is certified that error appears in the above-identified patent and that said Letters Patent are hereby corrected as shown below:

Title page, in the heading, priority data should read:
    -- Nov. 8, 1973    Austrian ......... A 9421/73 --;

Column 4, line 50, "carried" should read -- varied --;

Column 5, line 1, "length, polyethylene" should read
    -- length. Polyethylene --;

Column 8, line 44, "or" should read -- for --;

Column 13, claim 17, at line 45, "form" should read -- from --;

Column 14, claim 22, at line 12, omit "the".

Signed and Sealed this

Eighth Day of November 1977

[SEAL]

*Attest:*

RUTH C. MASON
*Attesting Officer*

LUTRELLE F. PARKER
*Acting Commissioner of Patents and Trademarks*